Feb. 10, 1942.  G. M. KRIEGBAUM ET AL  2,272,303
LID CONSTRUCTION
Original Filed Nov. 2, 1936
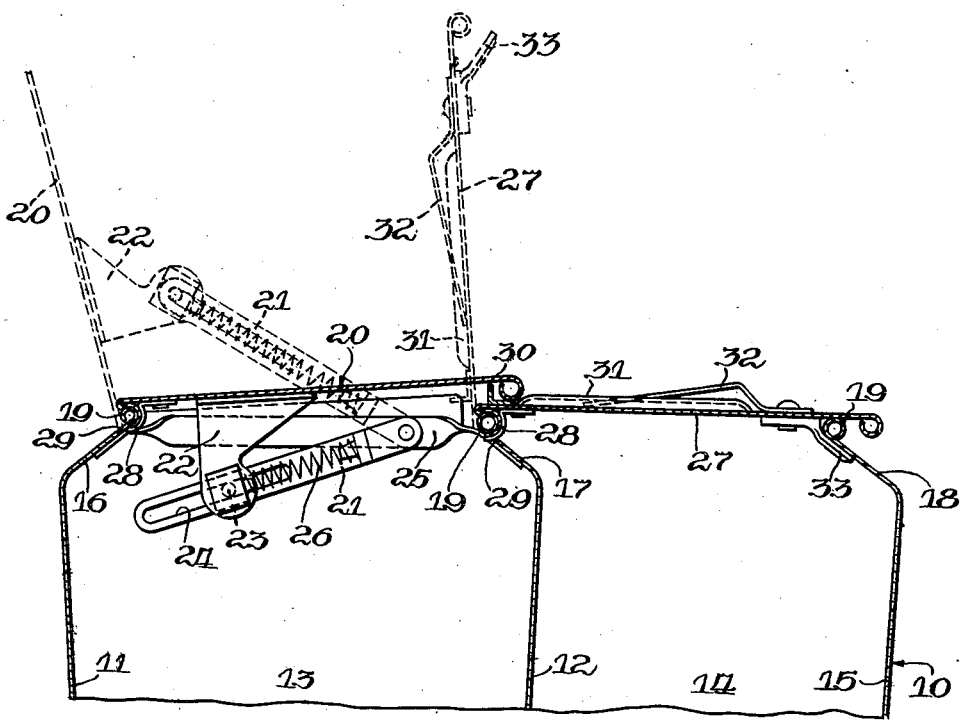
Inventor
George M. Kriegbaum
and David M. Morris.
By /. F. Lassagne
Att'y.

Patented Feb. 10, 1942

2,272,303

UNITED STATES PATENT OFFICE 2,272,303

LID CONSTRUCTION

George M. Kriegbaum and David M. Morris, Richmond, Ind., assignors to International Harvester Company, a corporation of New Jersey Original application November 2, 1936, Serial No. 108,744. Divided and this application August 2, 1937, Serial No. 156,932

8 Claims. (Cl. 220—29)

This application is a division of applicants' copending application, Serial No. 108,744, filed November 2, 1936, which has ripened into Patent No. 2,124,198, dated July 19, 1938.

This invention relates to a lid construction for adjacent grain and fertilizer hoppers for grain drills.

In hopper constructions where there are adjacent grain and fertilizer hoppers, it is customary to provide a separate lid for each of the hoppers. Generally, these lids are to be opened at the same time, and it has been found desirable to open the lids in the same movement.

An object of the invention is to provide an improved lid construction for fertilizer and grain hoppers.

A further object of the invention is to provide a lid construction for adjacent hoppers wherein the raising of one lid effects a raising of the other lid.

A further object of the invention is the provision of a lid arrangement for a container structure whereby the raising of one lid effects a partial raising of the other lid.

Another object of the invention is to provide an arrangement which will permit the raising of adjacent lids in the same movement.

Other objects of the invention will become apparent as the disclosure is made.

According to the present invention, a first lid is pivoted on the middle one of three spaced walls forming adjacent hoppers. A second lid is pivoted on one of the outside walls and extends across the pivoted end of the first lid. A toggle mechanism is associated with the second lid which holds the second lid in a closed position, and opens the second lid after the first lid has raised it part way. With this arrangement a raising of the first lid effects a partial raising of the second lid, and the toggle mechanism completely raises said second lid. The pivoting of each of the lids is effected through a bead and slot on the edge of the wall and an edge and strap attached to an edge of each of the lids.

The figure is a sectional elevational through adjacent grain and fertilizer hoppers for a grain drill, showing applicants' improved lid construction.

The figure shows the upper end of a combination grain and fertilizer hopper construction 10 for a grain drill mounted upon a wheel supported frame, not shown. The hopper construction has a front sheet metal wall 11 and a center sheet metal wall 12 separating the grain hopper 13 from the fertilizer hopper 14. A rear sheet metal wall 15 is provided which is similar in section to the walls 11 and 12. All of the sheet metal walls 11, 12 and 15 are formed from rolled sections which are identical in detail as to the form of the side and upper portions 16, 17 and 18. The upper edges of the walls are formed with a rolled bead 19 to provide a finished edge to the hoppers so that the operator will not be injured in any manner.

Closures have been provided for the grain hopper 13 and the fertilizer hopper 14. A closure or lid 20 for the grain hopper is pivotally mounted on the forward wall 11 of the grain hopper so that it may be raised vertically. When the lid 20 is opened to its dotted position, it is held there by means of the toggle or latch mechanism formed by a pivoted link 21 and a fixed member 22 secured to the lid. The member 22 has a pin 23 engaging a slot 24 in the member 21. It is, therefore, evident that the lid may be latched in its raised position. The link 21 is pivotally mounted on a support 25 extending across the hopper 13 and secured by welding or otherwise to the portions 16 and 17 of the walls 11 and 12. A spring 26 is mounted on the member 21 and acts against the pin 23 to keep the cover in its closed or open position.

The lid 20 is so formed as to overlie the rear end of a lid 27 which is provided for the fertilizer hopper 14. The fertilizer hopper lid 27 is formed so as to be hinged on the beaded portion 19 of the inner wall 12. The hinges for the lids 20 and 27 are formed by the lids and the beaded portions 19 of the walls 11 and 12. Strap members 28 are secured to each lid and so formed as to pass through a slot 29 formed adjacent the beads 19 in the portions 16 and 17 of the front and inner walls 11 and 12. A seal is formed between the lid 20 and the lid 27 by means of an angle iron 30 welded or otherwise secured to the lid 27 and extending the length of both lids. It is, therefore, obvious that rain cannot run into the hopper 13, but will be drained across the lid 27 to be discharged over the side of the hopper. Since the lid 20 overlies the lid 27, it is evident that as the lid 27 is raised, the lid 20 will also be raised a short distance, since the latch mechanism will move past center and move the lid 20 to a raised position. To aid the lid 20 in being raised by the lid 27, tracks 31 are raised in the lid 27. The lid 27 may be locked in closed position by means of a handle 32, of a latch 33, which engages the portion of the upper wall portion 18 of the fertilizer hopper 14.

It will be obvious that when the lid 27 has been raised far enough the rearward edge of the lid 20 will ride upon the handle 32. Thus, additional raising of the lid 20 is effected.

It is evident from the foregoing description, that applicants have provided a novel lid construction for a combined grain and fertilizer hopper wherein the raising of the fertilizer hopper lid effects the raising of the grain hopper lid.

Applicants intend to limit their invention only within the spirit and scope of the appended claims.

What is claimed is:

1. The combination with three spaced walls forming adjacent fertilizer and grain hoppers, of a first substantially horizontally disposed lid pivoted on the middle wall and extending across the fertilizer hopper, and of a second substantially horizontally disposed lid pivoted on the outside wall of the grain hopper and extending across the grain hopper and the pivoted end of the first lid, whereby raising of the first lid over the fertilizer hopper effects a raising of the second lid over the grain hopper.

2. The combination with adjacent fertilizer and grain hoppers having a common wall, of a first substantially horizontally disposed lid pivoted on the common wall and extending across one hopper and one outside wall, and of a second substantially horizontally disposed lid pivoted on the other outside wall and extending across the other hopper and the pivoted end of the first lid, there being on the first lid means for facilitating the raising of the second lid by the raising of the first, which means extends from the surface of the first lid and bears the edge of the second lid during the raising of the first lid.

3. The combination with a pair of adjacent hoppers having a common wall, of a first lid pivoted on the common wall and extending across the outside wall of one of the hoppers, a latch having a handle mounted on said first lid and adapted to engage said outside wall, a second lid pivoted on the outside wall of the second hopper and extending across the pivoted end of the first lid, and means for facilitating the raising of the second lid by the raising of the first lid, said means comprising a handle of the latch member extending from the surface of the first lid away from the hoppers upon which handle the edge of the second lid rides during the raising of the first lid.

4. The combination with a pair of adjacent hoppers for grain and fertilizer having a common wall, of a first lid pivoted on the middle wall and extending across the outside wall of one of the hoppers and having a latch and an actuating handle therefor on the surface of the lid away from the hoppers and having track portions raised in the same surface and of a second lid pivoted on the outside wall of the other hopper and extending across the pivoted edge of the first lid, whereby upon raising of the first lid the resulting riding of the free edge of the second lid first upon the track portions of the first lid and then upon the handle member effects a raising of the second lid.

5. The combination with adjacent grain and fertilizer hoppers, of a first lid pivoted centrally of the hoppers and extending across one hopper and an outside wall, and a second lid pivoted to an outside wall and extending across the pivoted edge of the first wall and held thereagainst by means of a spring toggle mechanism connected to the second lid and one container in such a manner that raising of the first lid facilitates the raising of the second lid and the spring toggle mechanism urges the second lid into a raised position.

6. The combination with a pair of adjacent containers of a first lid extending across one container from a pivot at one side thereof and a second lid extending across the other container in the same direction from a pivot point as the first lid extends from its pivot point, a toggle mechanism connected to the second lid and one of the containers for causing the raising of the first lid to effect raising of the second lid.

7. The combination with adjacent hoppers, of a first lid pivoted centrally of the hoppers and extending across one hopper and an outside wall, a second lid pivoted on an outside wall and extending across the pivoted edge of the first wall, and a spring mechanism connected to the second lid and one hopper in such a manner that the raising of the first lid will partially raise said second lid and said spring will move said second lid to an open position.

8. The combination with adjacent hoppers, of a first lid pivoted centrally of the hoppers and extending across one hopper and an outside wall, a second lid pivoted on an outside wall and extending across the pivoted edge of the first wall, and a toggle mechanism connected to the second lid and one hopper in such a manner that the raising of the first lid will partially raise the second lid and said toggle mechanism will move said second lid to an open position.

GEORGE M. KRIEGBAUM.
DAVID M. MORRIS.